United States Patent
Lei et al.

(10) Patent No.: US 10,185,334 B2
(45) Date of Patent: Jan. 22, 2019

(54) METHOD AND DEVICE FOR DETECTING TEMPERATURE OF RADIO REMOTE UNIT

(71) Applicant: DATANG MOBILE COMMUNICATIONS EQUIPMENT CO., LTD, Beijing (CN)

(72) Inventors: Xiaoyu Lei, Beijing (CN); Tao Duan, Beijing (CN); Huarong Sun, Beijing (CN); Liqiang Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 540 days.

(21) Appl. No.: 14/760,709

(22) PCT Filed: Dec. 30, 2013

(86) PCT No.: PCT/CN2013/090903
§ 371 (c)(1),
(2) Date: Jul. 14, 2015

(87) PCT Pub. No.: WO2014/114171
PCT Pub. Date: Jul. 31, 2014

(65) Prior Publication Data
US 2015/0338859 A1    Nov. 26, 2015

(30) Foreign Application Priority Data
Jan. 25, 2013    (CN) .......................... 2013 1 0030381

(51) Int. Cl.
*G05D 23/19*    (2006.01)
*G05F 1/66*    (2006.01)
*H04W 52/02*    (2009.01)

(52) U.S. Cl.
CPC ........... *G05D 23/1927* (2013.01); *G05F 1/66* (2013.01); *H04W 52/0206* (2013.01); *Y02D 70/00* (2018.01)

(58) Field of Classification Search
CPC . G05D 23/1927; G05F 1/66; H04W 52/0206; Y02B 60/50
See application file for complete search history.

(56) References Cited

U.S. PATENT DOCUMENTS 6,463,266 B1 *  10/2002  Shohara .................... H03J 7/04
                                                          375/219
9,332,505 B2 *   5/2016  Siomina ............... H04J 11/0023
(Continued)

FOREIGN PATENT DOCUMENTS

CN    201118575 Y    9/2008
CN    101833342 A    9/2010
(Continued)

OTHER PUBLICATIONS

Denker, M., "Remote Radio Head systems-Requirements and concept of lighting and overvoltage protection", Oct. 13-17, 2013, VDE VERLAG GMBH.*
(Continued)

*Primary Examiner* — Mohammad Ali
*Assistant Examiner* — Kelvin Booker
(74) *Attorney, Agent, or Firm* — Gokalp Bayramoglu (57) ABSTRACT

The present application provides a method and device for detecting temperature of a radio remote unit, to solve the problem that an RRU could be damaged due to an excessively high temperature. The method includes: acquiring temperature data of a radio remote unit; configuring power data of the radio remote unit according to the temperature data, when the temperature data is less than a temperature threshold or within the temperature threshold; and closing
(Continued)

radio frequency channel(s) of the radio remote unit when the temperature data is more than the temperature threshold.

19 Claims, 4 Drawing Sheets

(56) References Cited

U.S. PATENT DOCUMENTS

| | | | | |
|---|---|---|---|---|
| 9,347,796 | B1* | 5/2016 | Rapadas | G01D 4/002 |
| 2005/0088301 | A1* | 4/2005 | Abbruscato | B60R 25/00 |
| | | | | 340/539.32 |
| 2007/0173202 | A1* | 7/2007 | Binder | H04B 7/15542 |
| | | | | 455/68 |
| 2012/0155572 | A1* | 6/2012 | Kim | H03F 1/3247 |
| | | | | 375/297 |
| 2012/0252525 | A1* | 10/2012 | Frenger | H04W 52/0206 |
| | | | | 455/524 |
| 2012/0286866 | A1* | 11/2012 | Khanifar | H03F 1/0288 |
| | | | | 330/149 |
| 2013/0260702 | A1* | 10/2013 | Kenington | H04B 1/04 |
| | | | | 455/127.2 |
| 2013/0301547 | A1* | 11/2013 | Gupta | H04W 4/90 |
| | | | | 370/329 |
| 2013/0303150 | A1* | 11/2013 | Li | H04W 36/22 |
| | | | | 455/418 |
| 2014/0078973 | A1* | 3/2014 | Kazmi | H04W 8/22 |
| | | | | 370/329 |
| 2014/0092877 | A1* | 4/2014 | Kazmi | H04W 88/06 |
| | | | | 370/336 |
| 2014/0105046 | A1* | 4/2014 | Tellado | H04W 64/00 |
| | | | | 370/252 |
| 2014/0286219 | A1* | 9/2014 | Siomina | H04J 11/0023 |
| | | | | 370/311 |
| 2015/0031415 | A1* | 1/2015 | Liu | H01L 23/38 |
| | | | | 455/561 |
| 2015/0195792 | A1* | 7/2015 | Wigren | H04W 52/146 |
| | | | | 455/522 |
| 2015/0288445 | A1* | 10/2015 | Lins de Medeiros | |
| | | | | H04L 41/0681 |
| | | | | 398/20 |
| 2017/0219379 | A1* | 8/2017 | Rapadas | G01D 4/006 |
| 2018/0039316 | A1* | 2/2018 | Brown | G06F 1/3203 |
| 2018/0049297 | A1* | 2/2018 | Lydecker | H05B 37/0227 |

FOREIGN PATENT DOCUMENTS

| | | |
|---|---|---|
| CN | 101834644 A | 9/2010 |
| CN | 101868021 A | 10/2010 |
| CN | 102281357 A | 12/2011 |
| CN | 103118389 A | 5/2013 |
| EP | 2372859 A1 | 10/2011 |
| WO | WO2012040510 A1 | 3/2012 |

OTHER PUBLICATIONS

Skandakumaran, P.; Khanikar, V.; Smalc, M.; Norley, J. and Reis, B., "Passive, Lightweight Thermal Solutions for Remote Radio Head (RRH) Electronics", May 28-31, 2008, 11$^{th}$ Intersociety Conf on Thermal and Thermomechanical Phenomena in Electronic Systems.*

Zhu, D and Lei, M., "Cluster-based Dynamic DL/UL Reconfiguration Method in Centralized RAN TDD with Dense Deployment of Remote Radio Units", Jun. 2-5, 2013, 2013 IEEE 77$^{th}$ Vehicular Technology Conf.*

OASE, "Implementation and integration into new system Concepts", Jun. 2011, WP4 "System Concepts for Next Generation Optical Access Networks", Jul. 6, 2013., (Year: 2011).*

* cited by examiner

METHOD AND DEVICE FOR DETECTING TEMPERATURE OF RADIO REMOTE UNIT

TECHNICAL FIELD

The present application relates to the field of communication technologies, and particularly to a method and a device for detecting temperature of a radio remote unit.

BACKGROUND ART

At present, most broadband mobile communication adopts distributed base station architecture, that is, Building Base band Unit (BBU) and Radio Remote Unit (RRU) are connected by optical fibre. However, the RRU is generally installed at top end of an antenna tower where the work environment is harsh and heat is dissipated by the passive cooling. Further, since the RRU is exposed to the outdoor environment, the machine shell is needed to be hermetical.

Therefore, when atmosphere temperature is high, especially at summer noon, the heat dissipation capacity of the RRU is subjected to a serious challenge. Performance and service life of critical components inside the RRU, such as power amplifier, power supply and FPGA (Field-Programmable Gate Array) would be greatly influenced by the temperature. In worse conditions, this may cause the components in the RRU to be ineffective (for example, the power amplifier is burnt out, and thermal protective outage of the power supply module occurs (burnt out)), such that the base station where the RRU is installed could be out of service and network coverage may be influenced.

Thus, the RRU is provided with an over-temperature alarm, that is, a temperature threshold is set up. When the temperature in the shell monitored by a temperature sensor in the RRU is higher than the temperature threshold, an over-temperature alarm message may be reported to a main station. No further processing operations are adopted thereafter. Meanwhile, the monitored temperature may be updated every once in a while.

In the above method, however, although the over-temperature alarm is reported when the temperature in the shell exceeds the temperature threshold, the RRU will keep working without any other processing operations. The temperature in the shell where the RRU is located may increasingly rise up, which may finally cause that the power amplifier or the power supply module is burnt out and the base station is ineffective. Therefore, the above method still may not solve the problem resulted from that the temperature of the RRU is excessively high.

SUMMARY OF THE INVENTION

The embodiments of the present application provide a method and a device for detecting temperature of a radio remote unit, in order to solve the problem that the RRU could be damaged due to an excessively high temperature.

To solve above problem, the embodiment of the present application provides a method for detecting temperature of a radio remote unit, including:

acquiring temperature data of a radio remote unit;

configuring power data of the radio remote unit according to the temperature data, when the temperature data is less than a temperature threshold or within the temperature threshold; and closing radio frequency channel(s) of the radio remote unit when the temperature data is more than the temperature threshold.

Optionally, the method further includes: presetting temperature limits, wherein the temperature limits include: a first limit, a second limit, a third limit and a fourth limit, and in the temperature limits, the fourth limit is more than the third limit, the third limit is more than the second limit, the second limit is more than the first limit; and adopting the temperature limits to set up the temperature threshold to hierarchically detect the temperature data.

Optionally, the step of configuring power data of the radio remote unit according to the temperature data, when the temperature data is less than the temperature threshold, includes: when the temperature data is less than the first limit, determining the temperature data to be less than the temperature threshold; adjusting the power data of the radio remote unit to an initial value.

Optionally, before the step of adjusting the power data of the radio remote unit to the initial value, the method further includes: if the radio frequency channel(s) of the radio remote unit is closed, then activating the radio frequency channel(s); and if the radio frequency channel(s) of the radio remote unit is activated, then determining that the power data of the radio remote unit is not equal to the initial value.

Optionally, the step of configuring power data of the radio remote unit according to the temperature data, when the temperature data is within the temperature threshold, includes: when the temperature data is more than or equal to the first limit, and the temperature data is less than the second limit, determining the temperature data to be within the temperature threshold; and continuing to operate the radio remote unit with the power data.

Optionally, the step of configuring power data of the radio remote unit according to the temperature data, when the temperature data is within the temperature threshold, includes: when the temperature data is more than or equal to the second limit, and the temperature data is less than the third limit, determining the temperature data to be within the temperature threshold; and adjusting the power data of the radio remote unit to a first power value.

Optionally, the step of configuring power data of the radio remote unit according to the temperature data, when the temperature data is within the temperature threshold, includes: when the temperature data is more than or equal to the third limit, and the temperature data is less than the fourth limit, determining the temperature data to be within the temperature threshold; and adjusting the power data of the radio remote unit to a second power value.

Optionally, the step of closing radio frequency channel(s) of the radio remote unit when the temperature data is more than the temperature threshold, includes: when the temperature data is more than or equal to the fourth limit, determining the temperature data to be more than the temperature threshold, and then closing the radio frequency channel(s) of the radio remote unit.

Optionally, after the step of acquiring temperature data of a radio remote unit, the method further includes: detecting switch status of the radio frequency channel(s) of the radio remote unit; and determining that the radio frequency channel(s) of the radio remote unit is activated.

Optionally, the step of acquiring temperature data of a radio remote unit, includes: reading the temperatures transmitted from various sensors in the radio remote unit, when an absolute difference between temperatures transmitted from arbitrary two sensors is more than a setting value, re-reading the temperatures transmitted from various sensors; otherwise, constructing the temperatures transmitted from various sensors as the temperature data of the radio remote unit.

Optionally, the step of reading the temperatures transmitted from various sensors in the radio remote unit, when an absolute difference between temperatures transmitted from arbitrary two sensors is more than a setting value, re-reading the temperatures transmitted from various sensors; otherwise, constructing the temperatures transmitted from various sensors as the temperature data of the radio remote unit, includes: reading temperatures transmitted from sensors at various power amplifiers in the radio remote unit, when an absolute difference between temperatures transmitted from arbitrary two sensors at various power amplifiers is more than a first setting value, re-reading the temperatures transmitted from the sensors at various power amplifiers; when the absolute difference between temperatures transmitted from the sensors at various power amplifiers is less than the first setting value, reading temperatures transmitted from sensors at other regions except various power amplifiers; when an absolute difference between temperatures transmitted from arbitrary two sensors at other regions except various power amplifiers is more than a second setting value, re-reading temperatures transmitted from the sensors at other regions except various power amplifiers; and when the absolute difference between temperatures transmitted from various sensors at other regions except various power amplifiers is less than the second setting value, constructing the temperatures transmitted from various sensors as the temperature data of the radio remote unit.

Accordingly, the embodiment of the present application also provides a device for detecting temperature of a radio remote unit, including:

an acquisition module, configured to acquire temperature data of a radio remote unit;

a power adjustment module, configured to, configure power data of the radio remote unit according to the temperature data, when the temperature data is less than a temperature threshold or within the temperature threshold; and a channel closing module, configured to, close radio frequency channel(s) of the radio remote unit when the temperature data is more than the temperature threshold.

Optionally, the device further includes: a presetting module, configured to preset temperature limits, wherein the temperature limits comprises: a first limit, a second limit, a third limit and a fourth limit, and in the temperature limits, the fourth limit is more than the third limit, the third limit is more than the second limit, and the second limit is more than the first limit; and a threshold setup module, configured to adopt the temperature limits to set up the temperature threshold to hierarchically detect the temperature data.

Optionally, the power adjustment module is configured to, when the temperature data is less than the first limit, determine the temperature data to be less than the temperature threshold; and adjust power data of the radio remote unit to an initial value.

Optionally, the power adjustment module is further configured to, before adjusting the power data of the radio remote unit to the initial value, if the radio frequency channel(s) of the radio remote unit is closed, then activate the radio frequency channel(s); and if the radio frequency channel(s) of the radio remote unit is activated, then determine that the power data of the radio remote unit is not equal to the initial value.

Optionally, the power adjustment module is configured to, when the temperature data is more than or equal to the first limit, and the temperature data is less than the second limit, determine the temperature data to be within the temperature threshold, continue to operate the radio remote unit with the power data.

Optionally, the power adjustment module is configured to, when the temperature data is more than or equal to the second limit, and the temperature data is less than the third limit, determine the temperature data to be within the temperature threshold, and adjust the power data of the radio remote unit to a first power value.

Optionally, the power adjustment module is configured to, when the temperature data is more than or equal to the third limit, and the temperature data is less than the fourth limit, determine the temperature data to be within the temperature threshold; and adjust the power data of the radio remote unit to a second power value.

Optionally, the channel closing module is configured to, when the temperature data is more than or equal to the fourth limit, determine the temperature data to be more than the temperature threshold, and then close the radio frequency channel(s) of the radio remote unit.

Optionally, the power adjustment module is further configured to detect switch status of the radio frequency channel(s) of the radio remote unit; and determine that the radio frequency channel(s) of the radio remote unit is activated.

Optionally, the acquisition module is configured to read temperatures transmitted from various sensors in the radio remote unit, when an absolute difference between temperatures transmitted from arbitrary two sensors is more than a setting value, re-read the temperatures transmitted from various sensors; otherwise, construct the temperatures transmitted from various sensors as the temperature data of the radio remote unit.

Optionally, the acquisition module is configured to read temperatures transmitted from sensors at various power amplifiers in the radio remote unit, when an absolute difference between temperatures transmitted from arbitrary two sensors at various power amplifiers is more than a first setting value, re-read the temperatures transmitted from the sensors at various power amplifiers; when the absolute difference between temperatures transmitted from the sensors at various power amplifiers is less than the first setting value, read temperatures transmitted from sensors at other regions except various power amplifiers; when the absolute difference between temperatures transmitted from arbitrary two sensors at other regions except various power amplifiers is more than a second setting value, re-read temperatures transmitted from the sensors at other regions except various power amplifiers; and when the absolute difference between temperatures transmitted from various sensors at other regions except various power amplifiers is less than the second setting value, construct the temperatures transmitted from various sensors as the temperature data of the radio remote unit.

Compared with the prior art, the present application has following advantages:

Firstly, in the embodiments, after acquiring the temperature data of the RRU, if the temperature data is less than or within the temperature threshold, the power data of the RRU may be configured, and if the temperature data is more than the temperature threshold, then close the radio frequency channel(s) of the RRU. In the embodiments, different temperature control operations may be performed dependently on the temperatures of the RRU, so as to protect the RRU from being damaged due to excessively high temperature.

Secondly, in the embodiments, the temperature data of the RRU may be hierarchically detected according to the temperature limits, so as to determine various ranges of the temperature data, and to determine the temperature control operations of the RRU according to the on/off status of the radio frequency channel(s), thereby effectively controlling the temperature of the RRU by various methods within various temperature ranges, and protecting the RRU from being damaged due to excessively high temperature.

Again, in the embodiments, the temperatures may be transmitted through various sensors, and then whether the transmitted temperature is abnormal may be judged by the absolute difference between temperatures transmitted from arbitrary two sensors, thereby keeping out abnormal temperature data, allowing for acquiring exact temperature data, and subsequently adopting correct and effective measures to control the temperature of the RRU.

DETAILED DESCRIPTION OF THE EMBODIMENTS

In order to readily understand above objects, features and advantages of the present application, the present application will be described in detail in conjunction with accompanying drawings and specific embodiments hereinafter.

The embodiments of the present application provide a method for detecting temperature of a RRU, which can control the temperature of the RRU by configuring power data of the RRU or closing radio frequency channel(s) of the RRU, so as to avoid the problem that parts of the RRU are burnt out due to the excessively temperature, resulting in the base station is ineffective.

First Embodiment

Figure 1:
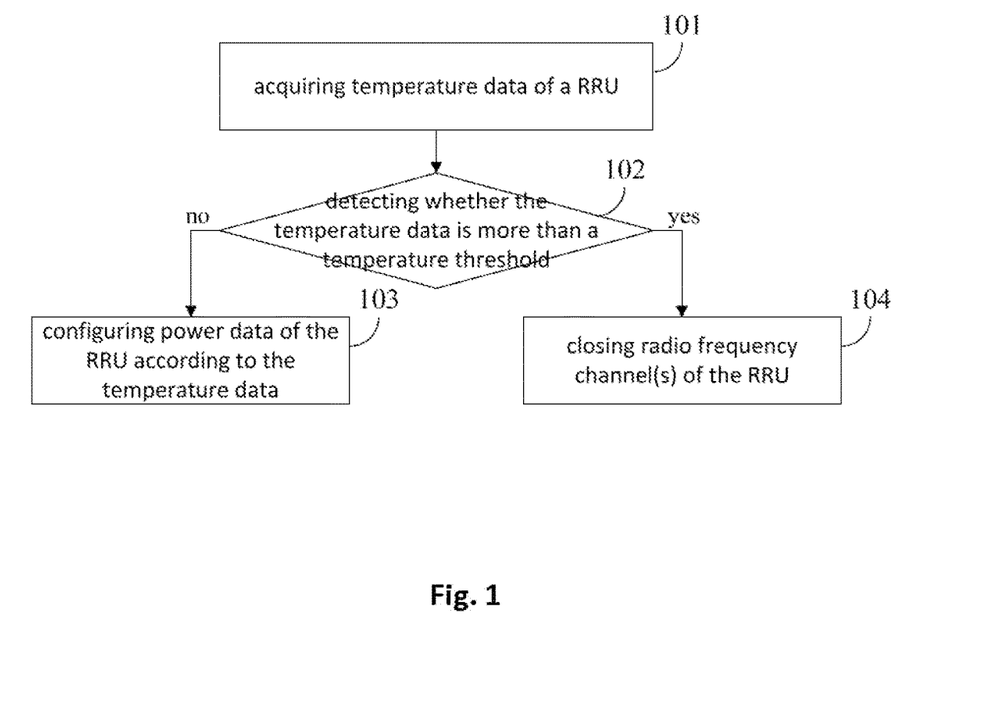
FIG. 1 is a flow chart of a method for detecting temperature of a RRU according to a first embodiment of the present application.

With reference to FIG. 1, it shows a flow chart of a method for detecting temperature of a RRU according to a first embodiment of the present application.

Step 101, acquiring temperature data of a RRU.

In this embodiment, one or more sensors may be provided in a shell of the RRU. The sensor(s) is a temperature sensor(s). Therefore, the temperature in the shell of the RRU may be measured by the sensor(s), so as to acquire the temperature data of the RRU.

Step 102, detecting whether the temperature data is more than a temperature threshold.

In this embodiment, a temperature threshold may be configured. The temperature threshold is one of criterions to measure whether the temperature of the RRU is excessively high, wherein the temperature threshold may be a temperature range.

Since temperature variation is usually a continuous process, the temperature variation process of the RRU varies from normal temperature to relatively high temperature then to excessively high temperature. Therefore, in the embodiment, when the temperature data is detected according to the temperature threshold, corresponding operations may be performed dependently on the location where the temperatures of the RRU are, in such a manner that when relatively high temperature of the RRU is detected initially, corresponding processing operations may be performed to protect stable and normal work of the RRU.

If yes, that is the temperature data is more than the temperature threshold, the method may proceed to Step 104; if no, that is the temperature data is not more than the temperature threshold, the method may proceed to Step 105.

Optionally, temperature limits may be preset, wherein the temperature limits may include: a first limit, a second limit, a third limit and a fourth limit, and in the temperature limits, the fourth limit is more than the third limit, the third limit is more than the second limit, the second limit is more than the first limit; the temperature limits may be adopted to set up the temperature threshold to hierarchically detect the temperature data.

Step 103, configuring power data of the RRU according to the temperature data.

There are two cases where the temperature data is not more than the temperature threshold: one is in that the temperature data is less than the temperature threshold, and the other one is in that the temperature data is within the temperature threshold.

The power data may be configured when the RRU works. Since the more the power is the more the heat is generated during the same period of time, when it is detected that the temperature data is not more than the temperature threshold, the power data of RRU may be configured according to the temperature data. For example, the power data of the RRU may be reduced by several decibels (db) and etc. In such a manner, an amount of heat dissipating could be controlled by varying the power data, so that the temperature of the RRU may be controlled.

Optionally, when the temperature data is less than the temperature threshold, the step of configuring the power data of the RRU according to the temperature data may comprise: when the temperature data is less than the first limit, determining the temperature data to be less than the temperature threshold; adjusting the power data of the RRU to an initial value.

Optionally, before adjusting the power data of the RRU to the initial value, the method may further comprise: if the radio frequency channel(s) of the RRU is closed, then activating the radio frequency channel(s); if the radio frequency channel(s) of the RRU is activated, then determining that the power data of the radio remote unit is not equal to the initial value.

Optionally, when the temperature data is within the temperature threshold, the step of configuring the power data of the RRU according to the temperature data may comprise:

1) when the temperature data is more than or equal to the first limit, and the temperature data is less than the second limit, determining the temperature data to be within the temperature threshold; continuing to operate the RRU with the power data;

2) when the temperature data is more than or equal to the second limit, and the temperature data is less than the third limit, determining the temperature data to be within the temperature threshold; adjusting the power data of the RRU to a first power value; and 3) when the temperature data is more than or equal to the third limit, and the temperature data is less than the fourth limit, determining the temperature data to be within the temperature threshold; adjusting the power data of the RRU to a second power value.

Step 104, closing radio frequency channel(s) of the RRU.

Optionally, when the temperature data is more than or equal to the fourth limit, determining the temperature data to be more than the temperature threshold, and then closing the radio frequency channel(s) of the radio remote unit.

When the temperature data is more than the temperature threshold, the temperature of the RRU may have been so excessively high that the temperature of the RRU could not possibly be controlled only by varying the power data. Therefore, the radio frequency channel(s) of the RRU may be closed to terminate the operations of the radio frequency channel(s), so as to control the temperature of the RRU and protect the RRU from being damaged due to the excessively high temperature.

Optionally, after acquiring the temperature data of the RRU, the method may further comprise: detecting switch status of the radio frequency channel(s) of the RRU.

In conclusion, in this embodiment, after acquiring the temperature data of the RRU, if the temperature data is less than or within the temperature threshold, the power data of the RRU may be configured, and if the temperature data is more than the temperature threshold, then close the radio frequency channel(s) of the RRU. In the embodiment, different temperature control operations may be performed dependently on the temperatures of the RRU, so as to protect the RRU from being damaged due to excessively high temperature.

Second Embodiment

Figure 2:
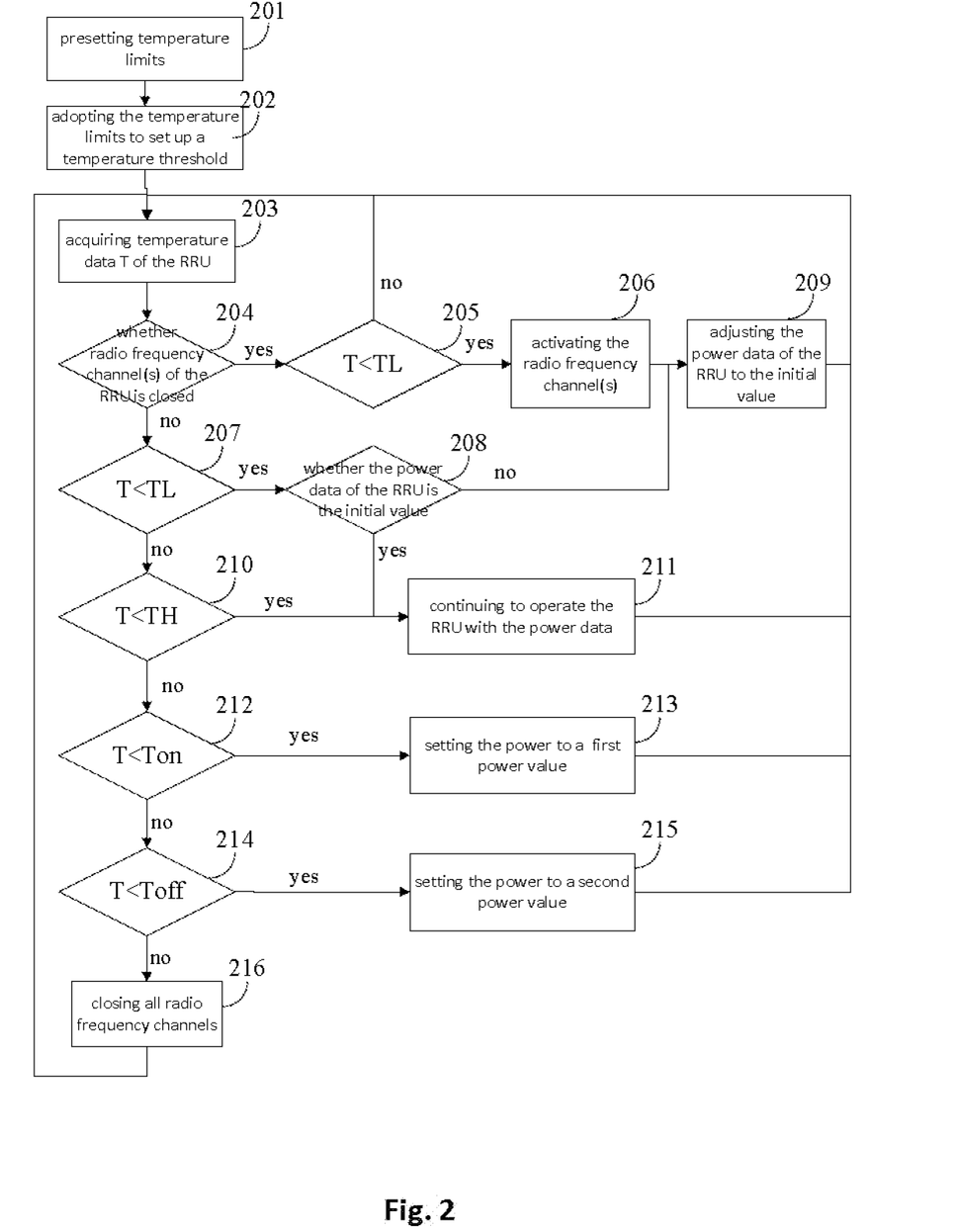
FIG. 2 is a flow chart of a method for detecting temperature of a RRU according to a second embodiment of the present application.

With reference to FIG. 2, it shows a flow chart of a method for detecting temperature of a RRU according to a second embodiment of the present application.

Step 201, presetting temperature limits.

Herein, the temperature limits may include: a first limit TL, a second limit TH, a third limit Tu and a fourth limit Toff, and TL<TH<Tu<Toff. Assuming that temperature data of a RRU is T, the temperature limits may particularly include:

1. The First Limit TL

TL is a temperature limit to restore a normal power, or may be used as a limit to restore the activation of radio frequency channel(s) of the RRU. That is, when T<TL is reached, the power of the RRU could be restored to normal, which means to restore to an initial value.

Herein, if the radio frequency channel(s) of the RRU is in an off-state, then the radio frequency channel(s) may be activated and the power of the RRU may be restored to the initial value. If the radio frequency channel(s) of the RRU is in an on-state, then it is necessary to compare the power data of the RRU with the initial value, and when it is determined that the power data of the RRU is the initial value, the RRU may run with the initial value without any other operations; and if it is determined that the power data of the RRU is not the initial value, then the power of the RRU may be restored to the initial value.

2. The Second Limit TH.

TH is one of the temperature limits to lower the power of the RRU, used to control the temperature of the RRU. That is, when T>TH, the power of the RRU may be possibly lowered.

3. The third limit Tu.

Tu is another temperature limit to lower the power of the RRU, used to further control the temperature of the RRU. That is, when T>Tu, the power of the RRU may be further adjusted.

4. The fourth limit Toff.

Toff is a limit to close the radio frequency channel(s). That is, when T>Toff is detected, the radio frequency channel(s) of the RRU may be possibly closed, so as to control the temperature of the RRU and protect the RRU from being damaged due to the excessively high temperature.

With above temperature limits, the temperature of the RRU may be detected hierarchically.

Herein, in configuration of the temperature limit, based on a principle that a device is protected from being damaged under extreme conditions, it is possible to depend on statistical data obtained in high-low temperature tests in development phase of the device. Since devices have different tolerances, the temperature limit values shall be set based on measured data of various devices in order to guarantee that the device is able to operate within safe temperature range.

For example, as it could be seen from experimental data analysis, a temperature in excess of 90° C. may cause some critical components in the RRU to be damaged or burnt out, while a temperature below 70° C. may keep components in the RRU from damage. Therefore, various temperature limits as mentioned above may be set as follows: TL=70° C., TH=75° C., Tu=85° C., Toff=90° C.

Step 202, adopting the temperature limits to set up a temperature threshold.

Since the temperature limits may be adopted to set up a temperature threshold, the hierarchical detection of the temperature data of the RRU may be realized. In accordance with different temperature ranges of the temperature data, corresponding operations may be performed to preferably control the temperatures of the RRU.

Step 203, acquiring temperature data of the RRU.

In the acquisition of the temperature data in prior art, sometimes inexact and abnormal values may be acquired. However, since there is no method for detecting the abnormal values, abnormal temperature data may be acquired so that the temperature of the RRU is incorrectly acquired.

Aiming at above problems, according to this embodiment, the RRU is configured with a plurality of sensors and setting values, in order to detect whether the temperatures transmitted from the sensors are abnormal.

Optionally, the step of acquiring temperature data of the RRU may comprise: reading the temperatures transmitted from various sensors in the RRU, if an absolute difference between temperatures transmitted from arbitrary two sensors is more than a setting value, re-reading the temperatures transmitted from various sensors; otherwise, constructing the temperatures transmitted from various sensors as the temperature data of the RRU.

According to this embodiment, sensors are provided at various amplifiers (power amplifiers) of the RRU and other regions except the various power amplifiers in the RRU. Therefore, depending on the positions of the sensors, different methods will be taken to measure the transmitted temperatures. The process particularly includes the following steps.

Figure 3:
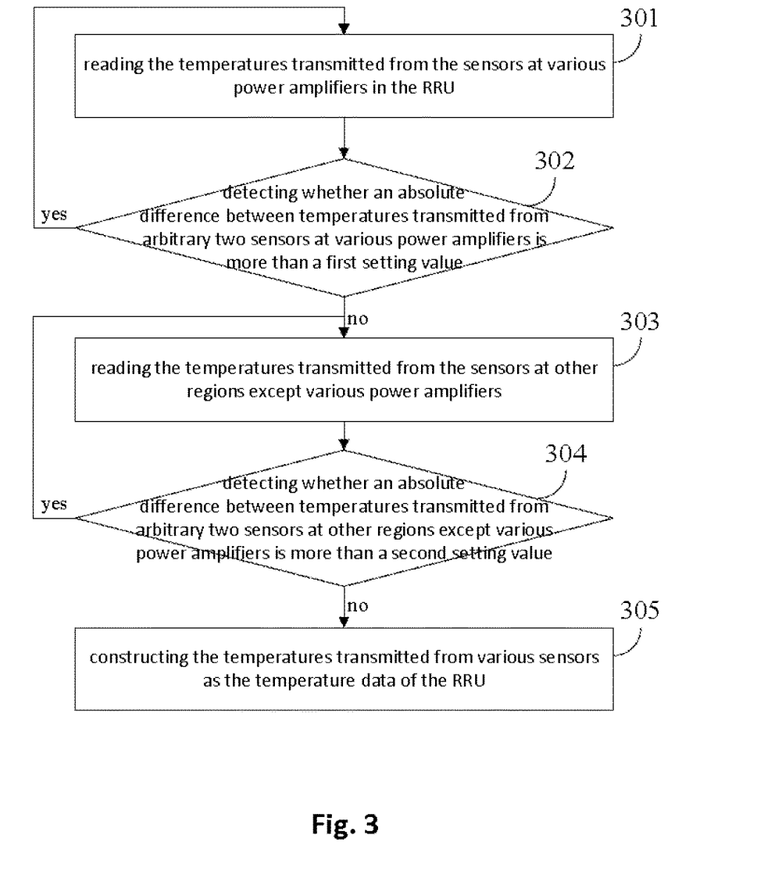
FIG. 3 is a flow chart of a method for acquiring temperature of a RRU according to the second embodiment of the present application.

With reference to FIG. 3, it shows a flow chart of a method for acquiring temperature of the RRU according to the second embodiment of the present application.

Optionally, the process of reading the temperatures transmitted from various sensors in the RRU, if an absolute difference between temperatures transmitted from arbitrary two sensors is more than the setting value, re-reading the temperatures transmitted from various sensors; otherwise, constructing the temperatures transmitted from various sensors as the temperature data of the RRU, may comprise the following steps.

Step 301, reading the temperatures transmitted from the sensors at various power amplifiers in the RRU.

Step 302, detecting whether an absolute difference between temperatures transmitted from arbitrary two sensors at various power amplifiers is more than a first setting value.

The first setting value is used to measure whether the temperature transmitted from the power amplifier is correct. For example, the first setting value is 10° C.

If yes, that is the absolute difference between temperatures transmitted from arbitrary two sensors at, various power amplifiers is more than the first setting value, then it may be indicated that the transmitted temperature is not correct, and the process may return to Step 301 to re-read the temperatures transmitted from the sensors at various power amplifiers.

If no that is the absolute difference between temperatures transmitted from the sensors at various power amplifiers is less than the first setting value, or that is the absolute difference between temperatures transmitted from the sensors at all power amplifiers is less than the first setting value, then the process may proceed to Step 303.

Step 303, reading the temperatures transmitted from the sensors at other regions except various power amplifiers.

If the absolute difference between temperatures transmitted from the sensors at various power amplifiers is less than the first setting value, the temperatures transmitted from the sensors at other regions except various power amplifiers may be read.

Step 304, detecting whether an absolute difference between temperatures transmitted from arbitrary two sensors at other regions except various power amplifiers is more than a second setting value.

Herein, the second setting value is used to measure whether the temperature transmitted from other region except various power amplifier in the RRU is correct. For example, the second setting value is 15° C.

If yes, that is the absolute difference between temperatures transmitted from arbitrary two sensors at other regions except various power amplifiers is more than the second setting value, then it may be indicated that the temperature transmitted from other region except various power amplifier in the RRU is abnormal, and the process may return to Step 303 to re-read temperatures transmitted from sensors at other regions except various power amplifiers.

If no, that is the absolute difference between temperatures transmitted from various sensors at other regions except various power amplifiers is less than the second setting value, or that is the absolute difference between temperatures transmitted from all sensors at other regions except various power amplifiers is less than the second setting value, then the process may proceed to Step 305.

Step 305, constructing the temperatures transmitted from various sensors as the temperature data of the RRU.

If no, that is the absolute difference between temperatures transmitted from various sensors at other regions except various power amplifiers is less than the second setting value, the temperatures transmitted from various sensors may be constructed as the temperature data of the RRU.

The exact temperatures transmitted from various sensors may be acquired by the above mentioned method. Then based on the temperatures, the temperature data of the RRU may be determined, for example by calculating an average value of temperatures transmitted from various sensors.

Step 204, detecting whether the radio frequency channel(s) of the RRU is closed.

After acquiring the temperature data of the RRU, it is possible to detect whether the radio frequency channel(s) of the RRU is closed.

If yes, that is the radio frequency channel(s) of the RRU is already closed, then the process may subsequently proceed to Step 205; if no, that is the radio frequency channel(s) of the RRU is not closed, the process may subsequently proceed to Step 207.

Step 205, detecting whether the temperature data is less than the first limit.

When the radio frequency channel(s) of the RRU is already closed, it is possible to detect whether T is less than TL.

If yes, that is the temperature data is less than the first limit (T<TL), the process may proceed to Step 206; if no, that is the temperature data is more than or equal to the first limit (T≥TL), the process may return to Step 203.

Step 206, activating the radio frequency channel(s).

When the radio frequency channel(s) of the RRU is already closed and the temperature data is less than the temperature threshold, and then the radio frequency channel(s) of the RRU may be activated.

Step 207, detecting whether the temperature data is less than the first limit.

When the radio frequency channel(s) of the RRU is activated, it is possible to detect whether T is less than TL.

If yes, that is the temperature data is less than the first limit (T<TL), then the process may proceed to Step 208; if no, that is the temperature data is more than or equal to the first limit (T≥TL), the process may proceed to Step 210.

Step 208, detecting whether the power data of the RRU is the initial value.

When the radio frequency channel(s) of the RRU is activated, if T<TL, then it is possible to detect whether the power data of the RRU is the initial value.

If yes, that is the power data of the RRU is the initial value, then the process may proceed to Step 211; if no, that is the power data of the RRU is not the initial value, the process may proceed to Step 209.

Step 209, adjusting the power data of the RRU to the initial value.

When the radio frequency channel(s) of the RRU is already closed and T<TL, after the radio frequency channel(s) of the RRU is activated, the power data of the RRU may be adjusted to the initial value.

When the radio frequency channel(s) of the RRU is activated, if T<TL and the power data of the RRU is not the initial value, the power data of the RRU may be adjusted as the initial value.

Step 210, detecting whether the temperature data is less than the second limit.

If the radio frequency channel(s) of the RRU is not closed, then it is possible to detect whether T is less than. TH.

If yes, that is the temperature data is less than the second limit (TL≤T<TH), then the process may proceed to Step 211, if no, that is the temperature data is more than or equal to the second limit (T≥TH), the process may proceed to Step 212.

Step 211, continuing to operate the RRU with the power data.

When the radio frequency channel(s) of the RRU is activated, if T<TL and the power data of the RRU is the initial value, it is possible to continue to operate the RRU with the initial value as the power data, without adjusting the power data of the RRU. Then the process may return to Step 203 to re-acquire temperature data.

When the radio frequency channel(s) of the RRU is not closed and T<TH, the temperature data is within the temperature threshold, and it is possible to continue to operate the RRU with the power data. Then the process may return to Step 203 to re-acquire temperature data.

Step 212, detecting whether the temperature data is less than the third limit.

When T≥TH, it is possible to further detect whether T is less than Tu.

If yes, that is the temperature data is less than the third limit (TH≤T<Tu), then the process may proceed to Step 213; if no, that is the temperature data is more than or equal to the third limit (T≥Tu), the process may proceed to Step 214.

Step 213, adjusting the power data of the RRU to a first power value.

If TH≤T<Tu, then it is possible to adjust the power data of the RRU, in order to further control the temperature of the RRU. In particular, it is possible to adjust the power data of the RRU to the first power value. The first power value is one of adjustment powers to control the temperature of the RRU, for example, which is set to, an initial value of −1.5 db. Then the process may return to Step 203 to re-acquire the temperature data.

Step 214, detecting whether the temperature data is, less than the fourth limit.

If T≥Tu, then it is possible to further detect whether T is less than Toff.

If yes, that is the temperature data is less than the fourth limit (Tu≤T<Toff), then the process may proceed to Step 215; if no, that is the temperature data is more than or equal to the fourth limit (T≥Toff), the process may proceed to Step 216.

Step 215, adjusting the power data of the RRU to a second power value.

When Tu≤T<Toff, the temperature data is within the temperature threshold. In order to control the temperature of the RRU, it is possible to adjust the power data of the RRU to the second power value. Then the process may return to Step 203 to re-acquire the temperature data.

Herein, the second power value is one of adjustment powers to control the temperature of the RRU, for example, which is set to an initial value of −3 db. When Tu≤T<Toff, it is possible to adjust current power data of the RRU to the initial value of −3 db.

Step 216, closing the radio frequency channel(s) of the RRU.

When T≥Toff, the temperature data is more than the temperature threshold, and then the radio frequency channel(s) of the RRU is closed. Then the process may return to Step 203 to re-acquire the temperature data.

In conclusion, in this embodiment, the temperature data of the RRU may be hierarchically detected according to the temperature limits, so as to determine various ranges of the temperature data, and to determine the temperature control operations of the RRU according to the on/off status of the radio frequency channel(s), thereby effectively controlling the temperature of the RRU by various methods within various temperature ranges, and protecting the RRU from being damaged due to excessively high temperature.

Secondly, in this embodiment, the temperatures may be transmitted through various sensors, and then whether the transmitted temperature is abnormal may be judged by the absolute difference between temperatures transmitted from arbitrary two sensors, thereby keeping out abnormal temperature data allowing for acquiring exact temperature data, and subsequently adopting correct and effective measures to control the temperature of the RRU.

Third Embodiment

Figure 4:
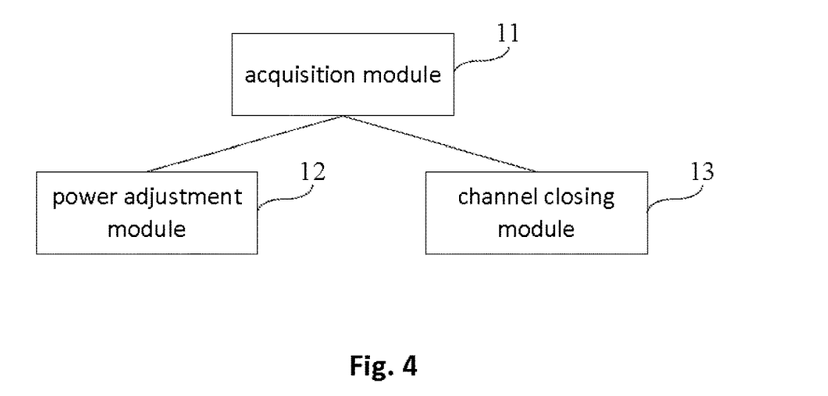
FIG. 4 is a block diagram of a device for detecting temperature of a RRU according to a third embodiment of the present application.

With reference to FIG. 4, it shows a block diagram of a device for detecting temperature of a RRU according to a third embodiment of the present application.

Accordingly, the embodiment of the present application also provides a device for detecting temperature of a RRU, which includes: an acquisition module 11, a power adjustment module 12 and a channel closing module 13.

The acquisition module 11 is configured to acquire temperature data of a RRU;

the power adjustment module 12 is configured to, when the temperature data is less than a temperature threshold or within the temperature threshold, configure power data of the RRU according to the temperature data; and the channel closing module 13 is configured to, when the temperature data is more than the temperature threshold, close radio frequency channel(s) of the RRU.

In conclusion, in the embodiment, after acquiring the temperature data of the RRU, if the temperature data is less than or within the temperature threshold, the power data of the RRU may be configured, and if the temperature data is more than the temperature threshold, then close the radio frequency channel(s) of the RRU. In the embodiment, different temperature control operations may be performed dependently on the temperatures of the RRU, so as to protect the RRU from being damaged due to excessively high temperature.

Fourth Embodiment

Figure 5:
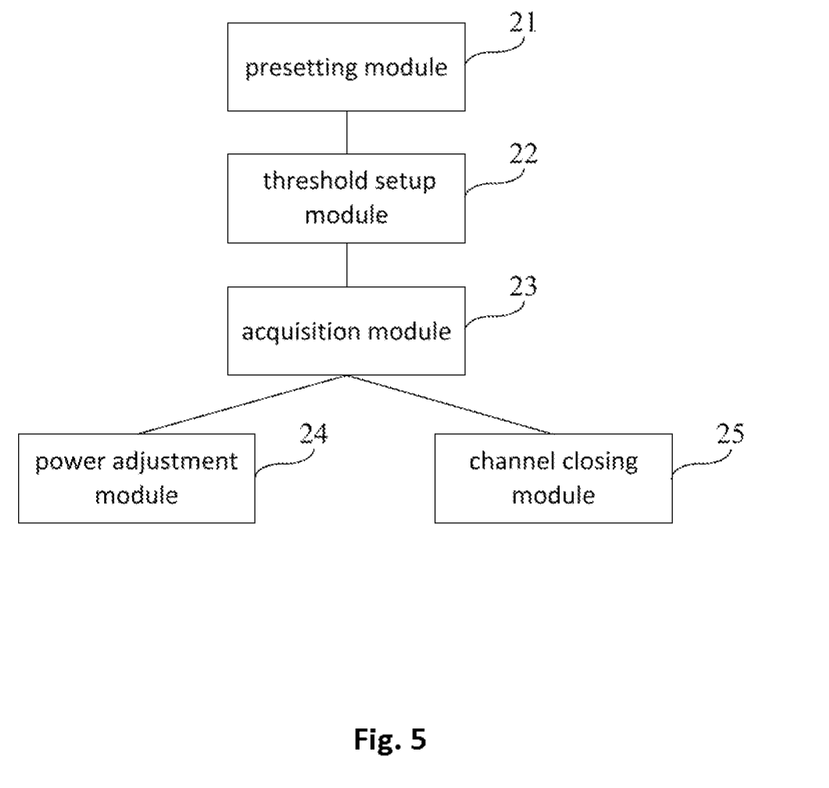
FIG. 5 is a block diagram of a device for detecting temperature of a RRU according to a fourth embodiment of the present application.

With reference to FIG. 5, it shows a block diagram of a device for detecting temperature of a RRU according to a fourth embodiment of the present application.

The device for detecting temperature of a RRU may include the following modules.

A presetting module 21 is configured to preset temperature limits. Wherein, the temperature limits comprises: a first limit, a second limit, a third limit and a fourth limit, and in the temperature limits, the fourth limit is more than the third limit, the third limit is more than the second limit, and the second limit is more than the first limit.

A threshold setup module 22 is configured to adopt the temperature limits to set up a temperature threshold to hierarchically detect the temperature data.

An acquisition module 23 is configured to acquire temperature data of the RRU.

A power adjustment module 24 is configured to, when the temperature data is less than the temperature threshold or within the temperature threshold, configures power data of the RRU according to the temperature data.

A channel closing module 25 is configured to, when the temperature data is more than the temperature threshold, close radio frequency channel(s) of the RRU.

In this embodiment, the power adjustment module 24 is configured to, when the temperature data is less than the first limit, determine the temperature data to be less than the temperature threshold; and adjust power data of the RRU to an initial value.

In this embodiment, the power adjustment module 24 is further configured to, before adjusting the power data of the RRU to the initial value, if the radio frequency channel(s) of the RRU is closed, then activate the radio frequency channel(s); and if the radio frequency channel(s) of the RRU is activated, then determine that the power data of the RRU is not equal to the initial value.

In this embodiment, the power adjustment module 24 is configured to, when the temperature data is more than or equal to the first limit, and the temperature data is less than the second limit, determine the temperature data to be within the temperature threshold, then continue to operate the RRU with the power data.

In this embodiment, the power adjustment module is configured to, when the temperature data is more than or equal to the second limit, and the temperature data is less than the third limit, determine the temperature data to be within the temperature threshold, and adjust the power data of the RRU to a first power value.

In this embodiment, the power adjustment module 24 is configured to, when the temperature data is more than or equal to the third limit, and the temperature data is less than the fourth limit, determine the temperature data to be within the temperature threshold, and adjust the power data of the RRU to a second power value.

In this embodiment, the channel closing module 25 is configured to, when the temperature data is more than or equal to the fourth limit, determine the temperature data to be more than the temperature threshold, and then close the radio frequency channel(s) of the RRU.

In this embodiment, the power adjustment module 24 is further configured to detect switch status of the radio frequency channel(s) of the RRU, and determine that the radio frequency channel(s) of the RRU is activated.

In this embodiment, the acquisition module 23 is configured to read temperatures transmitted from various sensors in the RRU, when an absolute difference between temperatures transmitted from arbitrary two sensors is more than a setting value, re-read the temperatures transmitted from various sensors; otherwise, construct the temperatures transmitted from various sensors as the temperature data of the RRU.

In this embodiment, the acquisition module 23 is configured to read temperatures transmitted from sensors at various power amplifiers in the RRU, when an absolute difference between temperatures transmitted from arbitrary two sensors at various power amplifiers is more than a first setting value, re-read the temperatures transmitted from the sensors at various power amplifiers; when the absolute difference between temperatures transmitted from the sensors at various power amplifiers is less than the first setting value, read temperatures transmitted from sensors at other regions except various power amplifiers; when the absolute difference between temperatures transmitted from arbitrary two sensors at other regions except various power amplifiers is more than a second setting value, re-read temperatures transmitted from the sensors at other regions except various power amplifiers; when the absolute difference between temperatures transmitted from various sensors at other regions except various power amplifiers is less than the second setting value, construct the temperatures transmitted from various sensors as the temperature data of the RRU.

In conclusion, in this embodiment, the temperature data of the RRU may be hierarchically detected according to the temperature limits, so as to determine various ranges of the temperature data, and to determine the temperature control operations of the RRU according to the on/off status of the radio frequency channel(s), thereby effectively controlling the temperature of the RRU by various methods within various temperature ranges, and protecting the RRU from being damaged due to excessively high temperature.

Secondly, in this embodiment, the temperatures may be transmitted through various sensors, and then whether the transmitted temperature is abnormal may be judged by the absolute difference between temperatures transmitted from arbitrary two sensors, thereby keeping out abnormal temperature data, allowing for acquiring exact temperature data, and subsequently adopting correct and effective measures to control the temperature of the RRU.

Accordingly, the embodiment of the present application also provides a computer readable recording medium in which a program for executing the method for detecting temperature of the RRU is recorded.

The computer readable recording medium may comprise any mechanism for storing or transmitting information in a computing device (e.g., a computer) readable form. For example, the machine readable medium includes Read Only Memory (ROM), Random Access Memory (RAM), magnetic disk storage medium, optical storage medium, flash memory medium, and propagation signals (e.g., carrier wave, infrared signals, digital signals, etc.) in the forms of electrics, optics, acoustics or any other forms.

Since the device embodiment is substantially similar to the method embodiments, the description thereof is relatively brief. As for the related parts thereof, reference may be made to the corresponding description of the method embodiments.

The various embodiments in the specification have been explained step by step. Each of the embodiments has only emphasized the differences from others, and the same or similar parts between embodiments could be made reference to each other.

The present application can be described in general context of a computer executable instruction which is executed by a computer, such as a program module. Generally, the program module may include routine, program, object, component, data structure and the like which can perform particular tasks or implement particular abstract data types. The present application can also be practiced in distributed computing environments. In such a distributed computing environment, the program module can be connected to a remote processing device through a communication network to perform the task. In the distributed computing environment, the program module may be located in local and remote computer storage medium including a memory device.

In the end, it will be explained that, in the specification, the terms "first", "second", etc. are only used herein to distinguish one element or operation from another one, and does not necessarily require or suggest that there are any actual relationship or sequence between these elements or operations. Further, the terms "comprise", "include" and any other variants thereof are intended to cover a non-exclusive "comprise", so that process, method, product or equipment which includes a series of elements may include not only those elements, but also other elements that do not be definitely listed, or also may include the inherent elements of the process, method, product or equipment. In the absence of more restrictions, an element defined by the statement "includes a . . . " does not mean to exclude other same elements in the process, method, product or equipment including this element.

The method and device for detecting temperature of a radio remote unit according to the present application have been described in detail. Herein the principles and embodiments of the application are illustrated by way of specific examples. The embodiments described above are only intended to help understand the method and main concept of the present application. Meanwhile, for an ordinary skilled person in the art, variations could be made to the specific embodiments and their application scope in accordance with the concept of the present application. In summary, the disclosure of the specification should not be construed as limiting of the present application.

What is claimed is:

1. A method for detecting temperature of a radio remote unit, comprising:
    acquiring temperature data of a radio remote unit;
    configuring power data of the radio remote unit according to the temperature data, when the temperature data is less than a temperature threshold or within the temperature threshold; and
    closing radio frequency channel(s) of the radio remote unit when the temperature data is more than the temperature threshold;
    reading temperatures transmitted from a plurality of sensors at a plurality of power amplifiers in the radio remote unit, when an absolute difference between temperatures transmitted from arbitrary two sensors at the plurality of power amplifiers is more than a first setting value, re-reading the temperatures transmitted from the plurality of sensors at the plurality of power amplifiers;
    when the absolute difference between temperatures transmitted from the plurality of sensors at the plurality of power amplifiers is less than the first setting value, reading temperatures transmitted from a plurality of sensors at other regions in the radio remote unit except the plurality of power amplifiers;
    when an absolute difference between temperatures transmitted from arbitrary two sensors at other regions except the plurality of power amplifiers is more than a second setting value, re-reading temperatures transmitted from the plurality of sensors at other regions in the radio remote unit except the plurality of power amplifiers; and
    when the absolute difference between temperatures transmitted from the plurality of sensors at other regions in the radio remote unit except the plurality of power amplifiers is less than the second setting value, constructing the temperatures transmitted from the plurality of sensors as the temperature data of the radio remote unit.

2. The method according to claim 1, wherein the method further comprises:
    presetting the plurality of temperature limits, wherein the plurality of temperature limits include: a first limit, a second limit, a third limit and a fourth limit, and in the temperature limits, the fourth limit is more than the third limit, the third limit is more than the second limit, the second limit is more than the first limit; and
    setting up the temperature threshold via the plurality of temperature limits to hierarchically detect the temperature data.

3. The method according to claim 2, wherein, the step of configuring power data of the radio remote unit according to the temperature data, when the temperature data is less than the temperature threshold, comprises:
    when the temperature data is less than the first limit, determining the temperature data to be less than the temperature threshold; and
    adjusting the power data of the radio remote unit to an initial value.

4. The method according to claim 3, wherein, before the step of adjusting the power data of the radio remote unit to the initial value, the method further comprises:
    if the radio frequency channel(s) of the radio remote unit is closed, then activating the radio frequency channel(s); and
    if the radio frequency channel(s) of the radio remote unit is activated, then determining that the power data of the radio remote unit is not equal to the initial value.

5. The method according to claim 2, wherein, the step of configuring power data of the radio remote unit according to the temperature data, when the temperature data is within the temperature threshold, comprises:
    when the temperature data is more than or equal to the first limit, and the temperature data is less than the second limit, determining the temperature data to be within the temperature threshold; and
    continuing to operate the radio remote unit with the power data.

6. The method according to claim 5, wherein, after the step of acquiring temperature data of a radio remote unit, the method further comprises:
    detecting switch status of the radio frequency channel(s) of the radio remote unit; and
    determining that the radio frequency channel(s) of the radio remote unit is activated.

7. The method according to claim 2, wherein, the step of configuring power data of the radio remote unit according to the temperature data, when the temperature data is within the temperature threshold, comprises:
    when the temperature data is more than or equal to the third limit, and the temperature data is less than the fourth limit, determining the temperature data to be within the temperature threshold; and
    adjusting the power data of the radio remote unit to a second power value.

8. The method according to claim 2, wherein, the step of closing radio frequency channel(s) of the radio remote unit when the temperature data is more than the temperature threshold, comprises:
    when the temperature data is more than or equal to the fourth limit, determining the temperature data to be more than the temperature threshold, and then closing the radio frequency channel(s) of the radio remote unit.

9. The method according to claim 2, wherein, the step of configuring power data of the radio remote unit according to the temperature data, when the temperature data is within the temperature threshold, comprises:
    when the temperature data is more than or equal to the second limit, and the temperature data is less than the third limit, determining the temperature data to be within the temperature threshold; and
    adjusting the power data of the radio remote unit to a first power value.

10. A device for detecting temperature of a radio remote unit, comprising:
    an acquisition module, configured to acquire temperature data of a radio remote unit;
    a power adjustment module, configured to configure power data of the radio remote unit differently according to the temperature data, when the temperature data is less than a temperature threshold or within the temperature threshold; and
    a channel closing module, configured to close radio frequency channel(s) of the radio remote unit when the temperature data is more than the temperature threshold;
    wherein the acquisition module is configured to read temperatures transmitted from a plurality of sensors at a plurality of power amplifiers in the radio remote unit, when an absolute difference between temperatures transmitted from arbitrary two sensors at the plurality of power amplifiers is more than a first setting value, re-read the temperatures transmitted from the plurality of sensors at the plurality of power amplifiers;

when the absolute difference between temperatures transmitted from the plurality of sensors at the plurality of power amplifiers is less than the first setting value, read temperatures transmitted from a plurality of sensors at other regions in the radio remote unit except the plurality of power amplifiers;

when the absolute difference between temperatures transmitted from arbitrary two sensors at other regions except the plurality of power amplifiers is more than a second setting value, re-read temperatures transmitted from the plurality of sensors at other regions in the radio remote unit except the plurality of power amplifiers; and when the absolute difference between temperatures transmitted from the plurality of sensors at other regions in the radio remote unit except the plurality of power amplifiers is less than the second setting value, construct the temperatures transmitted from the plurality of sensors as the temperature data of the radio remote unit.

11. The device according to claim 10, wherein the device further comprises:

a presetting module, configured to preset temperature limits, wherein the temperature limits comprises: a first limit, a second limit, a third limit and a fourth limit, and in the temperature limits, the fourth limit is more than the third limit, the third limit is more than the second limit, and the second limit is more than the first limit; and a threshold setup module, configured to adopt the temperature limits to set up the temperature threshold to hierarchically detect the temperature data.

12. The device according to claim 11, wherein, the power adjustment module is configured to, when the temperature data is less than the first limit, determine the temperature data to be less than the temperature threshold; and adjust power data of the radio remote unit to an initial value.

13. The device according to claim 12, wherein, the power adjustment module is further configured to, before adjusting the power data of the radio remote unit to the initial value, if the radio frequency channel(s) of the radio remote unit is closed, then activate the radio frequency channel(s); and if the radio frequency channel(s) of the radio remote unit is activated, then determine that the power data of the radio remote unit is not equal to the initial value.

14. The device according to claim 11, wherein, the power adjustment module is configured to, when the temperature data is more than or equal to the first limit, and the temperature data is less than the second limit, determine the temperature data to be within the temperature threshold, continue to operate the radio remote unit with the power data.

15. The device according to claim 14, wherein, the power adjustment module is further configured to detect switch status of the radio frequency channel(s) of the radio remote unit; and determine that the radio frequency channel(s) of the radio remote unit is activated.

16. The device according to claim 11, wherein, the power adjustment module is configured to, when the temperature data is more than or equal to the second limit, and the temperature data is less than the third limit, determine the temperature data to be within the temperature threshold, and adjust the power data of the radio remote unit to a first power value.

17. The device according to claim 11, wherein, the power adjustment module is configured to, when the temperature data is more than or equal to the third limit, and the temperature data is less than the fourth limit, determine the temperature data to be within the temperature threshold; and adjust the power data of the radio remote unit to a second power value.

18. The device according to claim 11, wherein, the channel closing module is configured to, when the temperature data is more than or equal to the fourth limit, determine the temperature data to be more than the temperature threshold, and then close the radio frequency channel(s) of the radio remote unit.

19. A non-transient computer readable recording medium for containing program instructions for causing a computer to perform the method of:

acquiring temperature data of a radio remote unit;

configuring power data of the radio remote unit differently according to the temperature data, when the temperature data is less than a temperature threshold or within the temperature threshold; and closing radio frequency channel(s) of the radio remote unit when the temperature data is more than the temperature threshold;

reading temperatures transmitted from a plurality of sensors at a plurality of power amplifiers in the radio remote unit, when an absolute difference between temperatures transmitted from arbitrary two sensors at the plurality of power amplifiers is more than a first setting value, re-reading the temperatures transmitted from the plurality of sensors at the plurality of power amplifiers;

when the absolute difference between temperatures transmitted from the plurality of sensors at the plurality of power amplifiers is less than the first setting value, reading temperatures transmitted from a plurality of sensors at other regions in the radio remote unit except the plurality of power amplifiers;

when an absolute difference between temperatures transmitted from arbitrary two sensors at other regions except the plurality of power amplifiers is more than a second setting value, re-reading temperatures transmitted from the plurality of sensors at other regions in the radio remote unit except the plurality of power amplifiers; and when the absolute difference between temperatures transmitted from the plurality of sensors at other regions in the radio remote unit except the plurality of power amplifiers is less than the second setting value, constructing the temperatures transmitted from the plurality of sensors as the temperature data of the radio remote unit.

* * * * *